(12) United States Patent
Foster et al.

(10) Patent No.: US 7,556,141 B2
(45) Date of Patent: Jul. 7, 2009

(54) CELLULAR BASE STRUCTURE FOR A RECIPROCATING SLAT CONVEYOR

(75) Inventors: Randall Mark Foster, Madras, OR (US); Kenneth A. Stout, Madras, OR (US); Michael Christopher House, Redmond, OR (US)

(73) Assignee: Keith Manufacturing Co., Madras, OR (US)

( * ) Notice: Subject to any disclaimer, the term of this patent is extended or adjusted under 35 U.S.C. 154(b) by 193 days.

(21) Appl. No.: 11/879,606

(22) Filed: Jul. 18, 2007

(65) Prior Publication Data

US 2009/0020396 A1    Jan. 22, 2009

(51) Int. Cl.
 *B65G 25/04* (2006.01)
(52) U.S. Cl. ............... 198/750.2; 198/750.1; 198/860.1
(58) Field of Classification Search ............ 198/750.1, 198/750.14, 750.2, 750.3, 860.1, 860.2
See application file for complete search history.

(56) References Cited

U.S. PATENT DOCUMENTS

| | | | | |
|---|---|---|---|---|
| 3,301,147 A | * | 1/1967 | Clayton et al. | 404/35 |
| 3,385,182 A | * | 5/1968 | Harvey | 404/35 |
| 3,984,961 A | * | 10/1976 | Chieger et al. | 52/592.1 |
| 4,611,708 A | * | 9/1986 | Foster | 414/525.1 |
| RE33,196 E | * | 4/1990 | Foster | 198/750.4 |
| 5,096,356 A | * | 3/1992 | Foster | 414/325 |
| 5,125,502 A | * | 6/1992 | Foster | 198/750.3 |
| 5,145,309 A | * | 9/1992 | Foster | 414/525.1 |
| 5,165,525 A | * | 11/1992 | Quaeck | 198/750.3 |
| 5,222,590 A | * | 6/1993 | Quaeck | 198/550.01 |
| 5,222,592 A | * | 6/1993 | Quaeck | 198/750.3 |
| 5,228,556 A | * | 7/1993 | Quaeck | 198/750.3 |
| 5,238,360 A | * | 8/1993 | Foster | 414/525.9 |
| 5,547,067 A | * | 8/1996 | Foster | 198/750.3 |
| 6,513,648 B1 | * | 2/2003 | Hallstrom et al. | 198/750.4 |
| 6,918,221 B2 | * | 7/2005 | Williams | 52/592.1 |
| 2008/0277246 A1 | * | 11/2008 | Berthelsen | 198/750.5 |

* cited by examiner

*Primary Examiner*—Gene Crawford
*Assistant Examiner*—William R Harp
(74) *Attorney, Agent, or Firm*—Delbert J. Barnard

(57) ABSTRACT

A base structure (10) for a reciprocating slat conveyor is formed from a plurality of cellular base sections (18) that are connected by tongue and groove joints (28, 30). Each section is constructed from a lower wall (20), an upper wall (22) placed vertically above the lower wall (20), first and second opposite side portions (22, 24) connected to the upper and lower walls (22, 20) and a plurality of divider walls (26) spaced apart between the side portions (22, 24) and extending vertically between the upper and lower walls (20, 22). Each base section (18) comprises at least one elongated guide beam (36) that extends upwardly from the upper wall (22). The guide beam (36) has a top (42) on which an elongated bearing (14) is placed. The bearing (14) snaps onto the top (20) and a conveyor slat (16) snaps onto the bearing (14).

9 Claims, 7 Drawing Sheets

CELLULAR BASE STRUCTURE FOR A RECIPROCATING SLAT CONVEYOR

TECHNICAL FIELD

This invention relates to reciprocating slat conveyors and more particularly, to cellular base structures for such conveyors formed from cellular sections that are connected along their longitudinal edges.

BACKGROUND OF THE INVENTION

Reciprocating slat conveyors are presently being used in a number of environments. They are being installed as floors in the bottoms of truck and trailer boxes for use in both loading and unloading cargo. The types of loads that are moved by a reciprocating slat conveyor vary widely and include liquid laden loads, such as garbage. It is undesirable to allow liquid to drip downwardly from a vehicle while the vehicle is in use. Therefore, there is a need for a reciprocating slat conveyor that is substantially leakproof.

The patent literature includes a number of examples of reciprocating slat conveyors. One example is shown by U.S. Pat. No. 5,547,067, granted Aug. 20, 1996 to Raymond Keith Foster. Another is disclosed by U.S. Pat. No. 6,848,569, granted Feb. 1, 2005, also to Raymond Keith Foster.

Typically a slat conveyor is supported by a base structure formed by longitudinal and transverse beams. There is a need for reciprocating slat conveyors having a base structure that is constructed to be substantially self supported making the framework formed longitudinal and transverse beams unnecessary. There is also a need for a reciprocating slat conveyor having a base structure that is capable of withstanding the impact of objects being dropped onto the conveyor from above. It is an object of this invention to provide a base structure construction for reciprocating slat conveyors that meets these needs.

BRIEF SUMMARY OF THE INVENTION

The present invention has a cellular base structure formed by a plurality of longitudinal base sections that are connected together along longitudinal side edges. This base structure includes a plurality of laterally spaced apart guide beams extending longitudinally of the conveyor and longitudinal channels between the guide beams. According to the invention, each base section has an upper wall, a lower wall spaced vertically below the upper wall, first and second opposite side portions connected to the upper and lower walls, and a plurality of divider walls spaced apart between the side portions and extending between the upper and lower walls. The upper and lower walls, the side portions and the divider walls together form laterally spaced apart cells which extends lengthwise of the base section.

In some embodiments, the first side portion includes a laterally outwardly opening groove extending longitudinally of the first side portion. The second side portion includes a laterally outwardly projecting tongue extending longitudinally of the second side portion. The tongue and groove are of a complementary size and shape, whereby the tongue on a first base section will fit into a groove in an adjacent second base section.

In one embodiment, the base sections include a single guide beam having sidewalls and a top. Each guide beam sidewall is substantially above a divider wall in the base structure below it.

In some embodiments of the invention, the first side portion of each base section extends between the upper and lower walls of the base section and the second side portion of the base section also extends between the upper and lower walls of the base section.

Beveled corners may be provided at the intersection between the upper wall and the first side portion, the upper wall and the second side portion, the lower wall and the first side portion and the lower wall and the second side portion. When the tongue on one base section is inside the groove in the adjacent base section, the bevels form a V-shaped upper channel between the two sections and a V-shape lower channel between the two sections. The V-shaped channels are adopted to receive weld beads or a bead of a sealant.

In some embodiments, the base sections each include a plurality of laterally spaced apart guide beams extending longitudinally of the conveyor, and longitudinal channels between the guide beams.

In some embodiments, the first side portion of a first base section and the second side portion of an adjoining second base section are adapted to form a guide beam when the two sections are together and the tongue is inside the groove.

According to one aspect of the invention, the base structure has a substantially planar bottom. In other embodiments, the base structure is longitudinally straight and laterally curved.

The base sections are extrusions. They are extruded from an aluminum alloy or some other suitable metal or structural plastic material.

Another aspect of the invention is to provide a joint between adjacent base sections that is held together by bolts or other fasteners extending through the two components of the tongue and groove joint.

Other objects, advantages and features of the invention will become apparent from the description set forth below, from the drawings, and from the principles that are embodied in the specific structures that are herein illustrated and described.

BRIEF DESCRIPTION OF THE SEVERAL VIEWS OF THE DRAWINGS

Like reference numerals refer to like parts throughout the several views of the drawing, and.

DETAILED DESCRIPTION OF THE ILLUSTRATED EMBODIMENT

Figures 1, 2, 3:
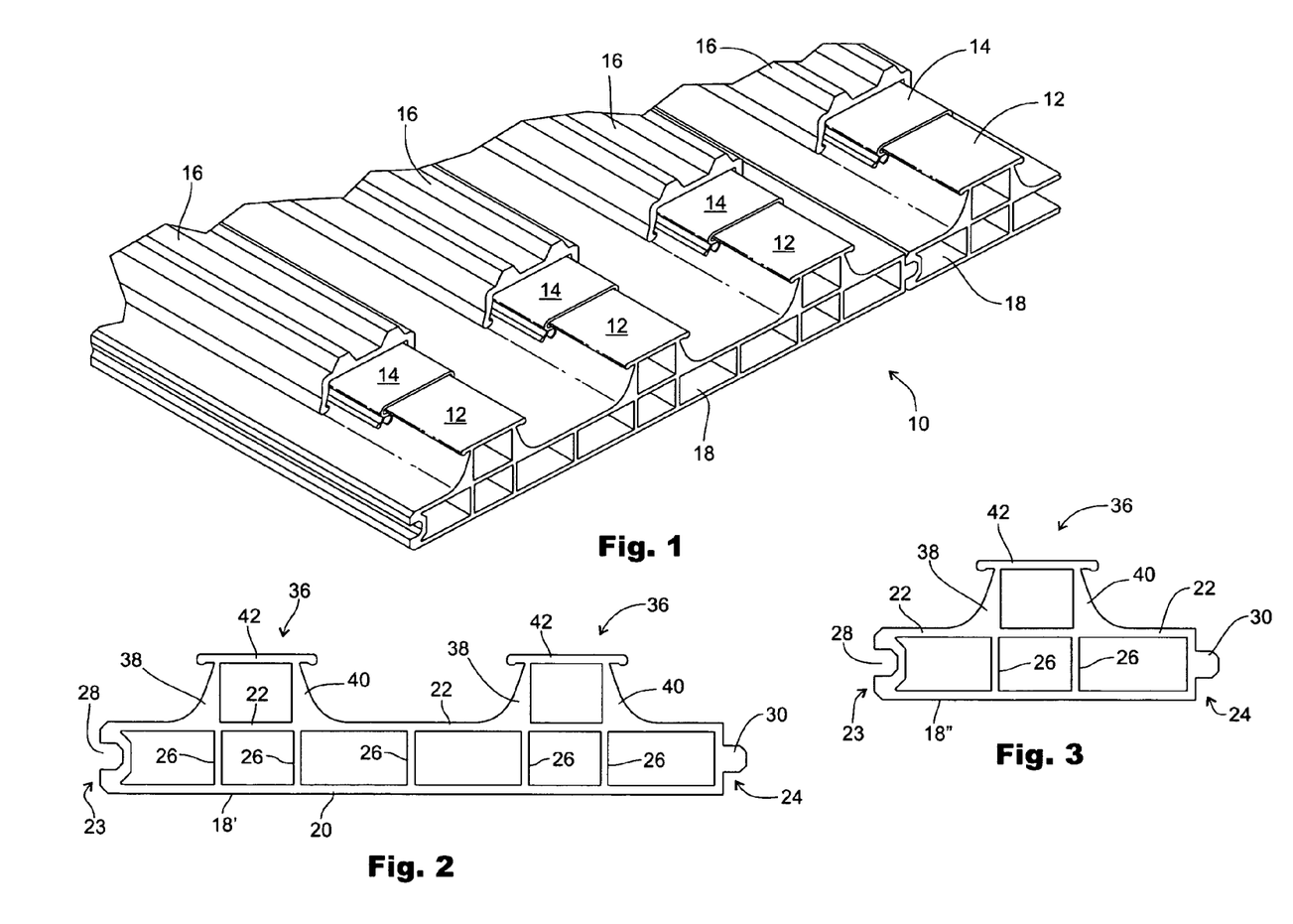
FIG. 1 is a fragmentary pictorial view of one embodiment of the invention, such view being taken from above and looking down towards the top, one side and one end of the assembly.
FIG. 2 is an end view of a section of a first cellular base structure.
FIG. 3 is a view like FIG. 2 showing a second section of the cellular base structure.

FIG. 1 shows a fragment of a slat conveyor composed of a cellular base structure 10 including a plurality of slat supporting beams 12, bearings 14 on the beams 12 and conveyor slats 16 on the bearings 14. In this particular conveyor, the base structure 10 is constructed from a plurality of cellular base structure sections 18 that are connected by tongue and groove joints.

Figure 4:
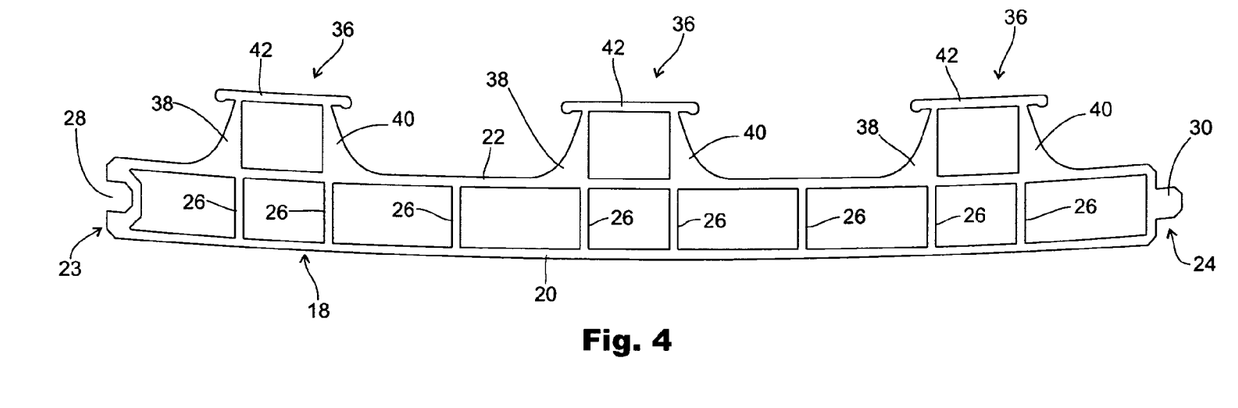
FIG. 4 is a view like FIGS. 2 and 3, but showing a third section of the cellular base structure.
Figure 5:
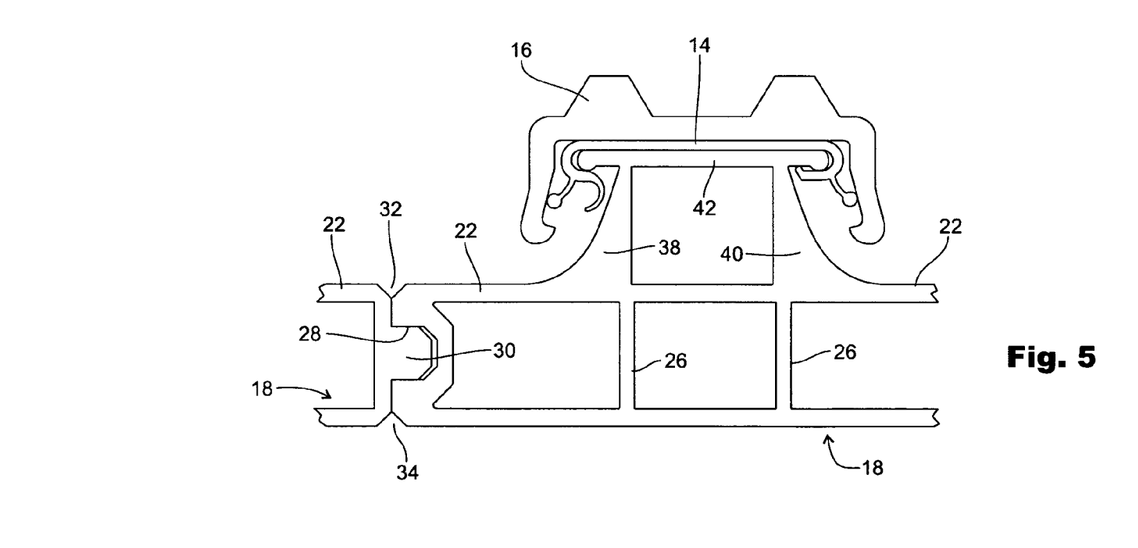
FIG. 5 is an enlarged scale end view of a fragmentary portion of a conveyor composed of a base structure and conveyor slats and bearings supported by the base structure.

FIGS. 2-4 show three embodiments of sections 18, 18', 18". Referring to FIG. 4, the base structure section 18 is elongated longitudinally of the conveyor. Each section 18 has a lower wall 20, an upper wall 22 placed vertically above the lower wall 20, first and second opposite side portions 23, 24 connected to the upper and lower walls 22, 20, and a plurality of divider walls 26 spaced apart between the side portions 22, 24 and extending between the upper and lower walls 22, 20. The first side portion 22 includes a laterally outwardly opening groove 28 extending longitudinally of the first side portion. The second side portion includes a laterally outwardly projecting tongue 30 extending longitudinally of the second side portion. The groove 28 and the tongue 30 are of a complementary size and shape so that the tongue 30 on a first base section 18 will snuggly fit into a groove 28 in an adjacent second base section 18. FIG. 5 shows the tongue 30 on a first section 18 in a groove 28 in a second section 18.

The upper and lower edges of the side portions 23, 24 are preferably beveled so that when the tongue 30 is in the groove 28, upper and lower V-grooves 32, 34 are formed at the joint. In preferred form, weld beads or sealant beads are provided in one or both of the V-grooves 32, 34.

Each of the illustrated base sections includes at least one elongated guide beam 36 that extends upwardly from the upper wall of the base section. In the illustrated embodiments, sections 18 have three guide beams 36 (FIG. 4). Sections 18' have two guide beams 36 (FIG. 2). Sections 18" have one guide beam 36 (FIG. 3). It is within the scope of the invention to provide the base structure sections with no more guide beams or more than three guide beams. A given base structure 10 may be composed of any combination of base structure sections, containing any number of guide beams, or no guide beams, to achieve the desired configuration of the completed base structure and the quantity of guide beams.

Preferably, the guide beams have spaced apart sidewalls 38, 40 and a top 42. Preferably, the sidewalls 38, 40 are vertically aligned with a pair of the divider walls 26. As shown by FIGS. 1 and 5, the bearings 14 are snap fitted down onto the tops 42 and the slats 16 are snap fitted down onto the bearings 14. This construction of the bearings 14 and the slats 16 is shown in detail in U.S. Pat. No. 5,547,067, granted Aug. 20, 1996, to Raymond Keith Foster. The contents of this patent is incorporated herein.

The number of conveyor slats 16, the width of the slats and the length of the slats are variables. Preferably, however, the number of slats is a multiple of three. For example, a conveyor may have eighteen slats divided into sets and groups. Slats 1, 4, 7, 10, 13, 16 make up a first set. Slats 2, 5, 8, 11, 14, 17 make up a second set. Slats 3, 6, 9, 12, 15, 18 make up the third set. Each set of slats is connected to a drive mechanism for the set. The groups are slats 1, 2, 3 and 4, 5, 6 and 7, 8, 9, etc. In use, the drive mechanisms are operated in unison to move the slats 1-18 in unison for a predetermined stroke distance (e.g. one foot) in the direction of desired conveying movement. Then, the slats are stopped and are retracted one set at a time.

In a typical prior art conveyor, the conveyor structure is supported by a framework composed of longitudinal and transverse frame members. The cellular construction of the base structure 10 makes it possible to either eliminate the frame structure below the conveyor or reduce it in size down to a few members. This is because the cellular construction of the base structure 10 is capable of supporting the conveyor slats 16 and the load on the conveyor with little or no additional structure necessary below the conveyor. The sections 18, 18', 18" are longitudinally straight and are either laterally straight or laterally curved. When laterally curved sections 18, 18', 18" are connected to form the base structure 10, the base structure is longitudinally straight and laterally curved. Preferably, the curvature is a circular curvature.

When the base structure sections 18, 18', 18" are welded together, the sections that make up the base structure 10 are assembled on a supporting surface. The tongues 30 are inserted into the grooves 28. Then, weld beads are provided in the particular set of grooves 32, 34 that are directed upwardly at the time. For example, if it is elected to assemble the floor in an upright condition, the sections 18, 18', 18" are assembled and weld beads are provided in the V-grooves 32. Then, the base structure 18 is flipped over so that its top is directed downwardly and its bottom is directed upwardly. Then, additional weld beads are provided in the V-grooves 34. Now the assembled base structure is capable of being handled and installed in a trailer or other installation of which it becomes a part. When the assembly is complete, the bearings 14 and slats 16 are installed. As shown by U.S. Pat. No. 5,547,067, the bearings 14 may be constructed in longitudinal sections but the conveyor slats 16 are continuous throughout the full length of the conveyor.

Figures 6, 7:
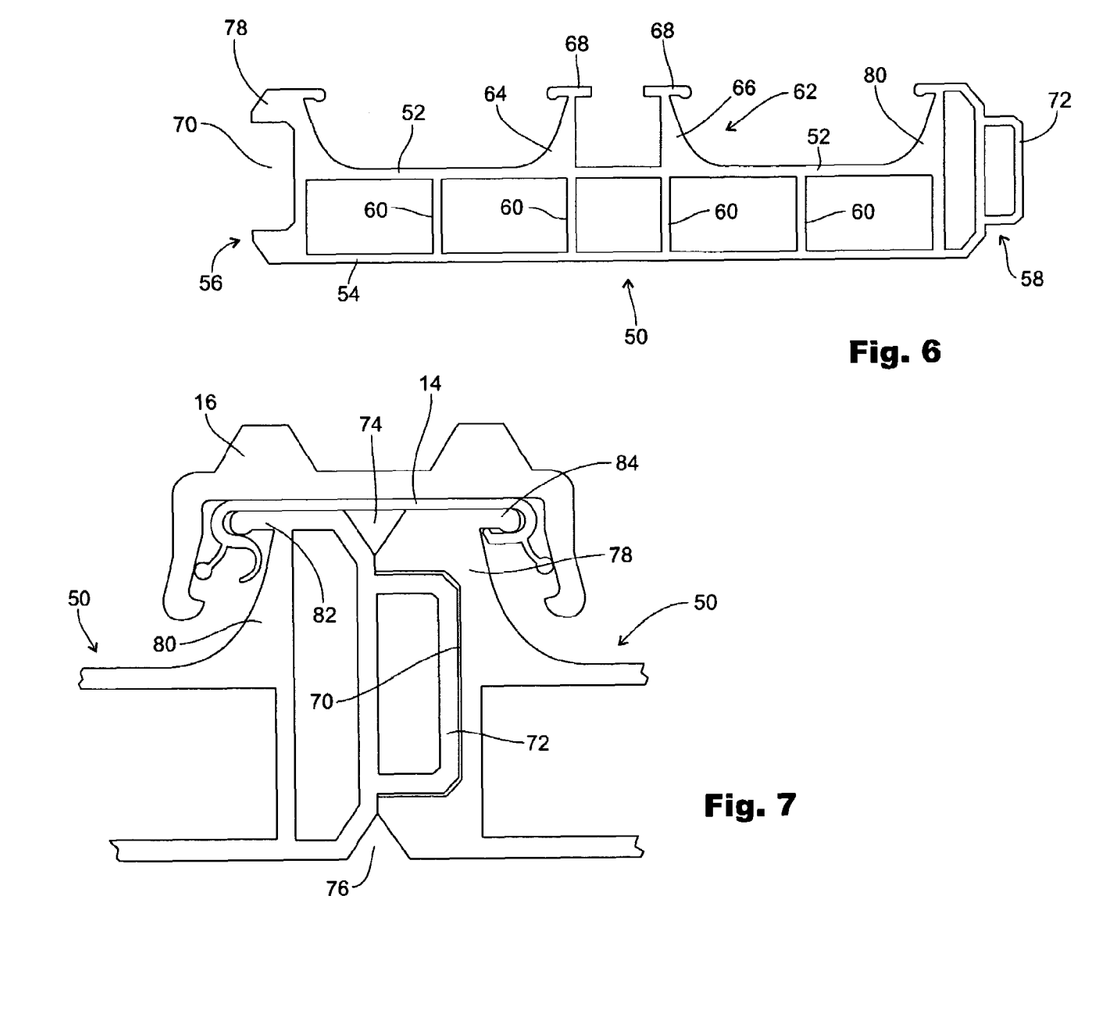
FIG. 6 is an end view of a fourth section of the cellular base structure.
FIG. 7 is an enlarged scale fragmentary end view of a joint formed by and between the base structure sections shown by FIG. 6, such view showing a slat supporting beam formed at the joint, and a bearing and a slat on said beam.

FIGS. 6 and 7 show another embodiment of the invention. It is composed of a plurality of base structure sections 50 having an upper wall 52, a lower wall 54 spaced below the upper wall 52, first and second side portions 56, 58, and divider walls 60 extending between the upper and lower walls 52, 54. Preferably, the cellular structure formed by the upper and lower walls 52, 54, the side portions 56, 58 and the divider walls 60 supports at least one upwardly projecting guide beam 62. Preferably also, the side portions 56, 58 each provides complementary portions of additional support beams that are formed by these side portions at the joints between connecting base structure sections 50. Referring to FIG. 6, the support beam 62 has a first sidewall 64, a second sidewall 66 and a top portion 68. As shown by FIGS. 6 and 7, the side portion 56 of a first base structure section 50 is formed to include a longitudinal groove 70 and a side portion 58 is formed to include a complementary longitudinal tongue 72. As shown by FIG. 7, the tongue 72 is sized and shaped to fit within the groove 70. As in the first embodiment, the upper and lower edges of the side portions 56, 58 are beveled to form V-grooves 74, 76. Preferably, when the sections are joined together and weld beads are placed in the V-grooves 74, 76. Side portion 56 includes side part 78 of the guide beam formed at the joint. Side portion 58 includes side part 80 of the support beam that is formed at the joint. Top portions 82, 84 form a top for the guide beam that is formed at the joint. FIG. 7 shows the bearing 14 on the guide beam and shows the conveyor slat 16 on the bearing 14. The arrangement of the bearing 14 and conveyor slat 16 on the support beam 62 is much the same as shown in FIG. 7. One side portion of the bearing 14 rests on one side part of the top 68 and the other side part of the bearing 14 rests on the other side part of the top 68.

Figure 8:
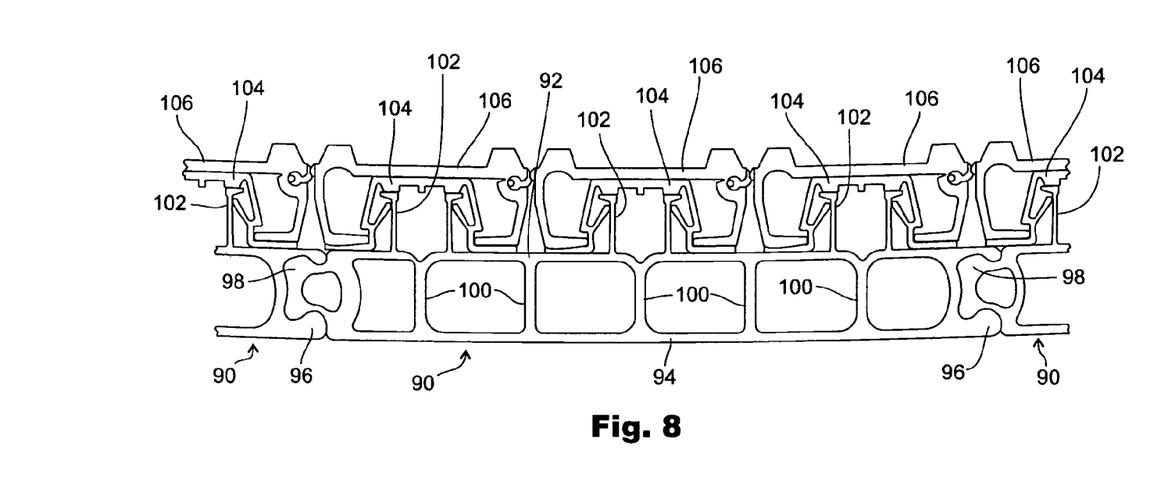
FIG. 8 is a fragmentary end view of another embodiment of the invention.

FIG. 8 shows an end view of a section 90 and end views of portions of adjoining sections 90 that are connected together by an interlocking joint structure. The base structure sections 90 have an upper wall 92, a lower wall 94 spaced below the upper wall 92, side portions 96, 98, and divider walls 100 extending between the upper and lower walls 92, 94. Support beams 102 extend upwardly from the upper wall 92. Bearings 104 sit down on the support beams 102 and conveyor slats 106 sit down on the bearings 104. Bearings 104 may be like the bearings disclosed in U.S. Ser. No. 11/334,979, filed Jan. 18, 2006. The conveyor slats 106 are similar in construction to the conveyor slats disclosed in Ser. No. 11/334,979. In this embodiment, the side portions 96, 98 form an interlocking joint structure which will hereinafter be described.

Figure 9:
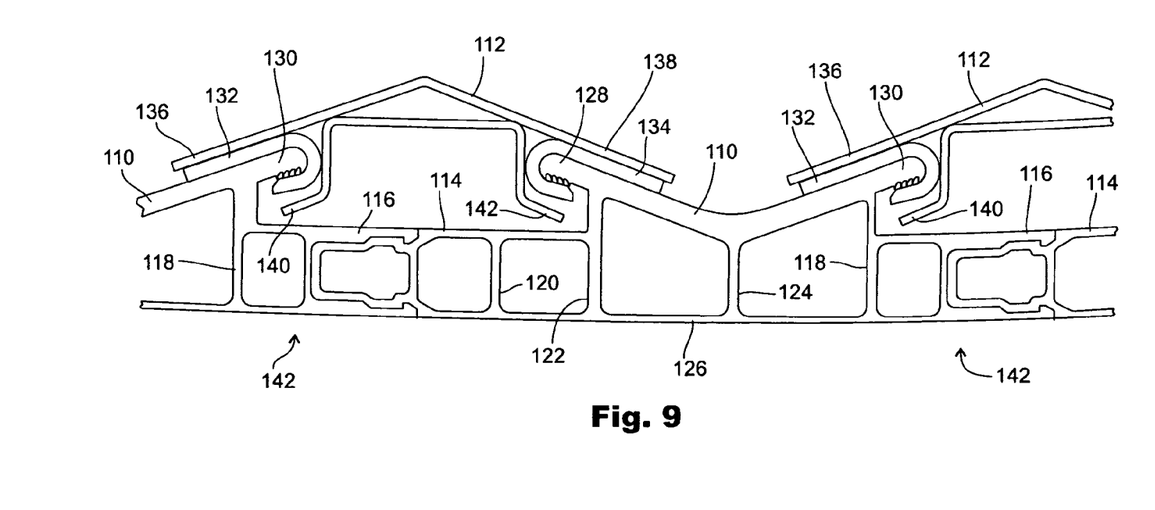
FIG. 9 is a fragmentary end view of yet another embodiment of the invention.

FIG. 9 shows an embodiment of the invention incorporated into what is known as a V-slat conveyor. This conveyor is constructed from alternating fixed and moving slats 110, 112. In this embodiment, the fixed slats 110 are parts of an upper wall which includes side portions 114, 116. Divider walls 118, 120, 122, 124 extend between the upper wall 110, 114, 116 and a lower wall 126. The stationary slats 110 have side portions 128, 130 onto which bearing members are placed. The moving slats 112 have side parts 136, 138 which set down on the upper walls of the bearings 132, 134. The moving slats 112 include retainers having side parts 140, 142 positioned below the lower walls of the bearings 132, 134. In this embodiment, the base structure sections are connected together by a joint structure 142 that is hereinafter described.

Figure 10:
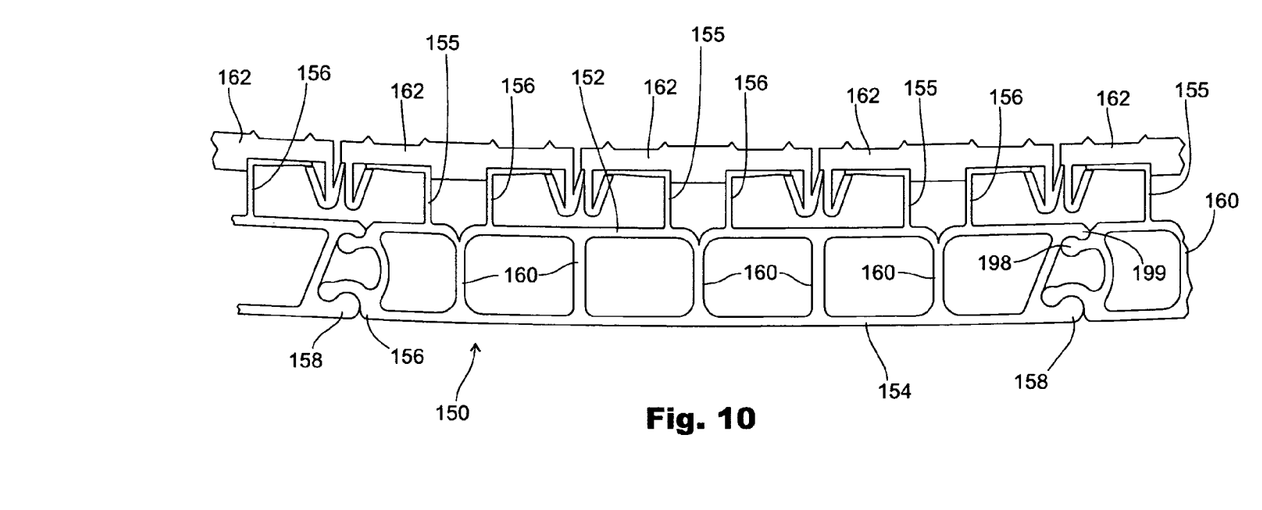
FIG. 10 is a view like FIG. 8 of a further embodiment of the invention.

FIG. 10 shows an embodiment in which the base structure sections 150 have an upper wall 152, a lower wall 154 spaced below the upper wall 152, side portions 156, 158 and divider walls 160 which extend between the upper wall 152 and the lower wall 150. Support beams 155, 156 extend upwardly from the upper wall 152 to form supports 155, 156 for conveyor slats 162. The support beams 155, 156 are made from the same metal as the rest of the base structure section 150. The conveyor slats 162 are constructed from a suitable structural plastic that is preferably self-lubricated. This construction of the support beams 155, 156 and the conveyor slats 162 is disclosed in co-pending application Ser. No. 11/823,914, filed Jun. 30, 2007 and entitled Reciprocating Slat Conveyors ("EL"), filed by inventors Scott Michael Delamarter, Daniel W. Jackson and James P. Drago. The contents of this application are hereby incorporated herein by this specific reference.

Figure 11:
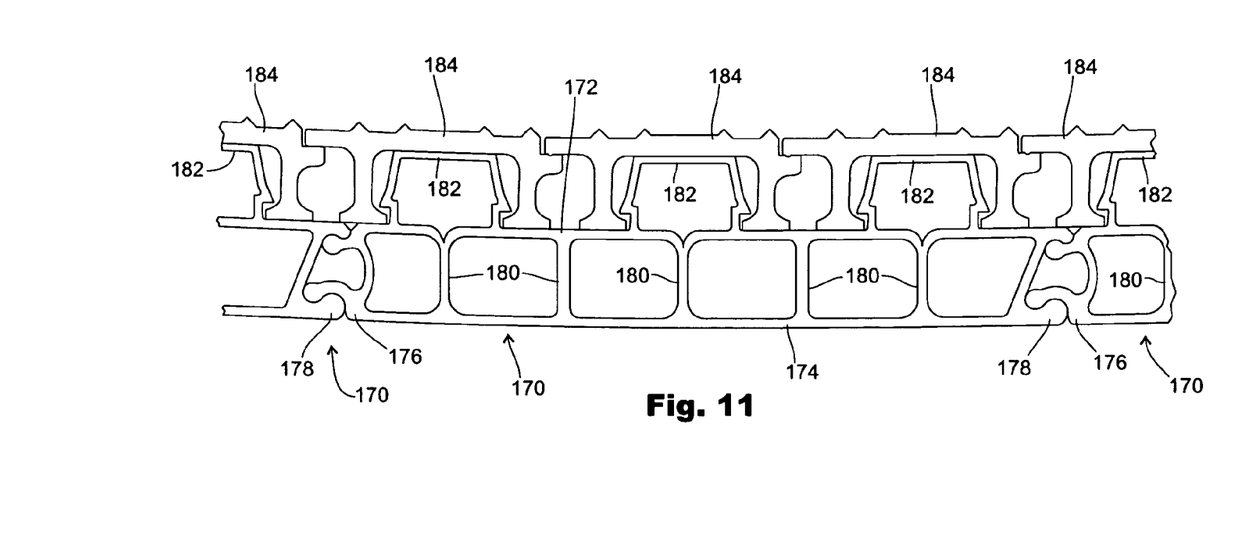
FIG. 11 is a view like FIGS. 8 and 10 of still another embodiment of the invention.

The embodiment of FIG. 11 is like the embodiment of FIG. 10 except for the construction of the slat support beams and the conveyor slats. In this embodiment the base structure sections are designated 170. Each section has an upper wall 172, a lower wall 174 spaced below the upper wall 172, side portions 176, 178, and divider walls 180. In this embodiment, the support beams 182 are formed integral with the upper wall 172 and they are formed from the same material as the base structure section 170, e.g. structural aluminum. The conveyor slats 184 are preferably constructed from a structural plastic. The slat support beams 182 are essentially like the slat beams disclosed in U.S. Pat. No. 5,447,222, granted Sep. 5, 1995, to Raymond Keith Foster. The slats 184 are essentially like the slats disclosed by FIG. 8 in U.S. Pat. No. 5,301,798, granted Apr. 12, 1994, to Arthur L. Wilkens.

Figure 12:
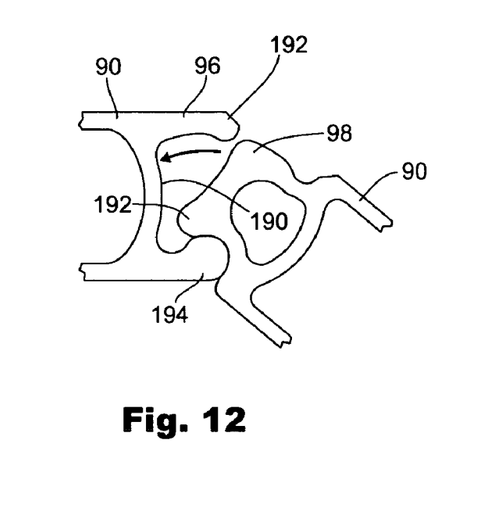
FIG. 12 is a fragmentary end view of the joint structure shown in FIG. 8, such view showing a tongue component of the joint at the beginning of insertion into a groove component of the joint.
Figure 13:
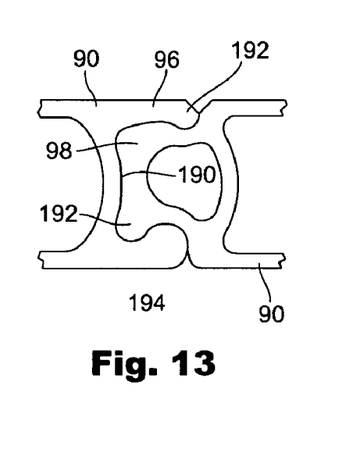
FIG. 13 is a view like FIG. 12, but showing the tongue and groove joint components engaged.

FIGS. 12 and 13 show the joint construction that is in the embodiment of FIG. 8. In this embodiment, the groove 190 formed in side portion 96 is formed by upper and lower portions having inwardly projecting edges. Side portion 98 is sized and shaped to fit within the groove 190. As shown in FIG. 12, lip 192 on side portion 98 may fit over lip 194 on side portion 96. Then, the base structure section 90 is rotated in the direction indicated by the arrow. This moves the upper part of side portion 98 past lip 196 and allows the tongue 98 to snap fit into the groove 190, into the position shown by FIG. 13. This embodiment includes upper and lower V-grooves which may receive weld beads or sealant beads.

Figure 14:
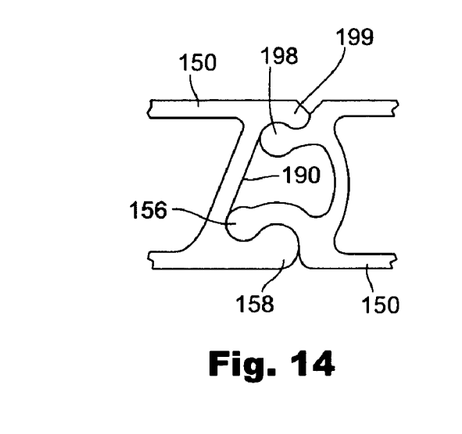
FIG. 14 is a view of the joint shown by FIG. 11.

FIG. 14 shows the joint used in the embodiments of FIGS. 10 and 11. It has a similar construction and is assembled in essentially the same way as the joint showed by FIGS. 12 and 13. Lip 156 is placed on lip 158 and the section 150 on the right is rotated so as to snap fit portion 198 passed lip 199, into the position shown by FIGS. 10, 11 and 14. This embodiment also has V-grooves at the top and bottom of the joint in which a weld bead or a sealant bead may be placed.

Figure 15:
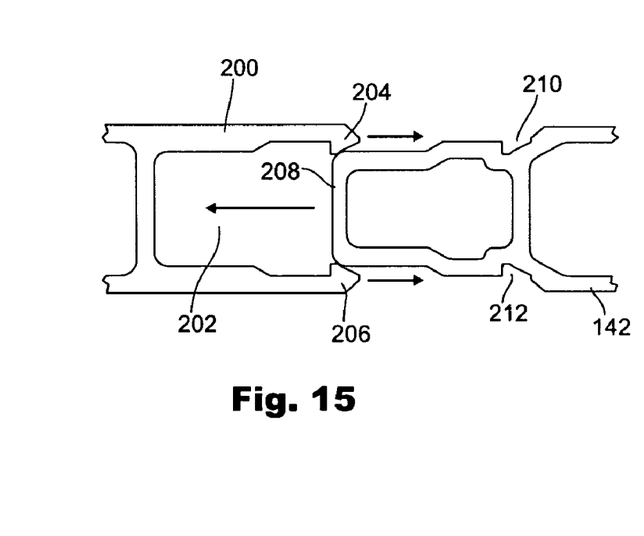
FIG. 15 is a view of the joint shown by FIG. 9 at the start of insertion of the tongue into the groove.
Figure 16:
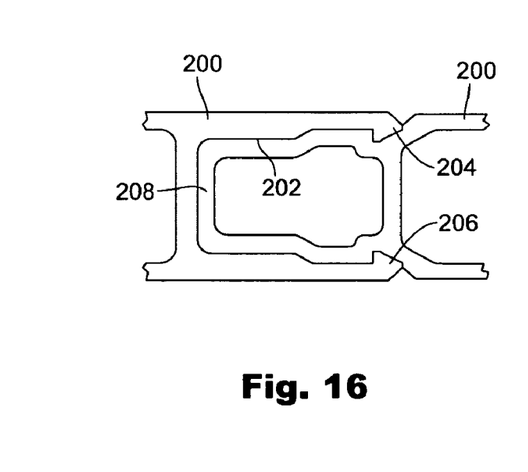
FIG. 16 is a view like FIG. 15, but showing the tongue in the groove.

FIGS. 15 and 16 show the joint construction that is in the embodiment of FIG. 9. Side portion 200 includes a socket or groove 202 having an entrance bordered by lips 204, 206. The adjoining section 142 has a tongue 208 with a narrow entrance portion and a wider base portion. The base portion includes grooves 210, 212. As shown by FIG. 16, the narrow end portion of the tongue 208 is inserted into the groove 206 and the two sections are moved together. This moves the wider base portion of the tongue 208 against the lips 204, 206, spreading them apart as the wider portion moves into the socket 202. When the tongue 208 is in the socket 202, the lips 204, 206 snap into the grooves 210, 212, as shown in FIGS. 9 and 16. This engagement of the lips 204, 206 in the grooves 210, 212 locks the two parts together. V-grooves are formed top and bottom of the joint for the reception of a weld bead if it is desired to use welding to secure the joint, or a sealant bead.

Figure 17:
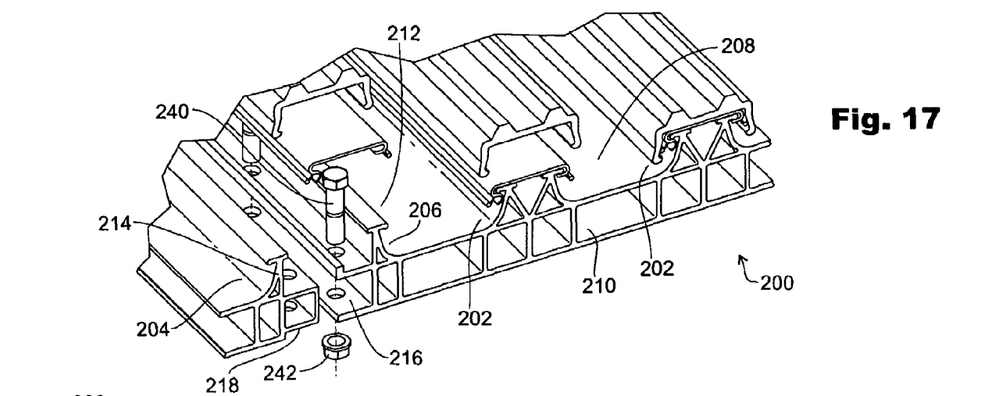
FIG. 17 is a pictorial view like FIG. 1 of a modified construction of the base structure and the joints between the sections of the base structure, such view showing some parts assembled and others in an exploded condition, and showing the two joint components spaced apart.
Figure 18:
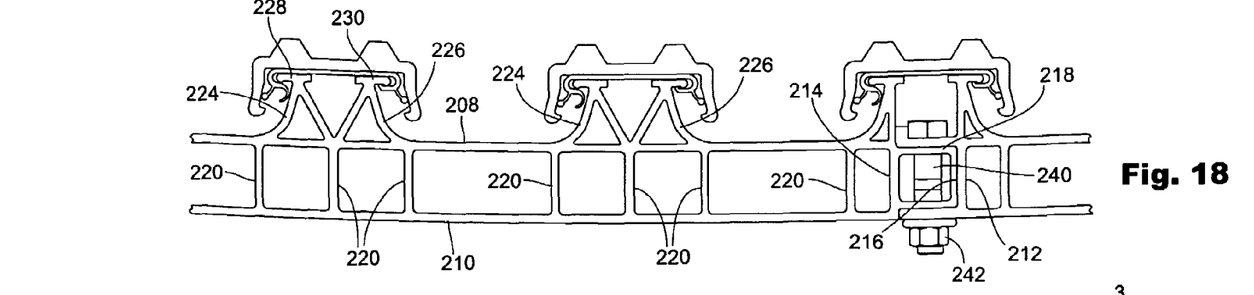
FIG. 18 is a fragmentary end view of the portion of the conveyor that is shown in the box in FIG. 19.
Figure 19:
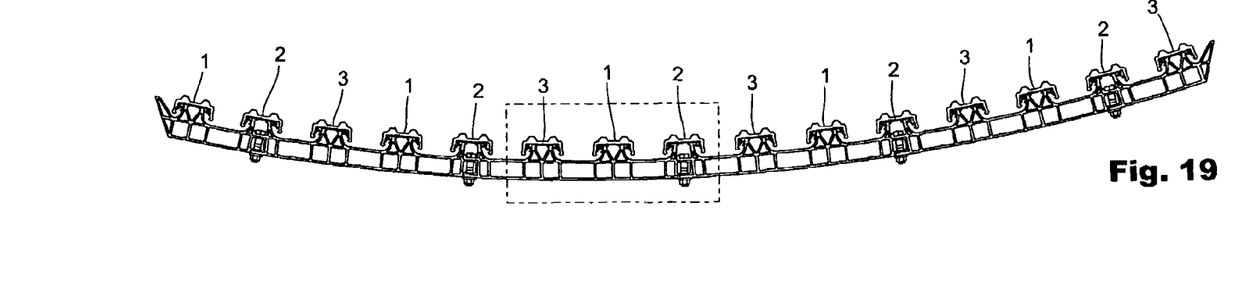
FIG. 19 is an end view of the embodiment shown by FIGS. 17 and 18, with some parts exploded out from their assembled positions in the view.

FIGS. 17-19 show a cellular base construction that has, by way of example, two full width beams 202 and two half beams 204, 206. In this embodiment, each beam section 200 has a top wall 208, a bottom wall 210, a first side portion 212 and a second side portion 214. Side portion 212 has a laterally opening socket 216. Side portion 214 has a tongue 218. Socket 216 opens laterally outwardly and extends the full length of the section 200. Section 200 also includes divider walls 220 that extend between and interconnect the upper and lower walls 208, 210. As shown by FIGS. 17-19, the divider walls 220 are laterally spaced apart. They extend longitudinally of the base section and together with the top wall 208, the bottom wall 210, and the side portions 214, 216, form cells which extend longitudinally of the section 200.

The support beams for the slats may comprise side portions 224, 226 that extend longitudinally of the section 200. Each beam side portion 224, 226 may have a top part 228, 230 that rests on top of a pair of web walls where the web walls meet. The web walls have lower portions which connect with the top wall 208 generally over a divider wall 220. The two web walls that form side portion 224 converge together and meet where they are joined to the top part 228. In a like fashion, the two web parts that form side portion 226 converge together and meet where they join top part 230. An elongated bearing 14 like the bearing shown by FIG. 5 snap fits onto the top parts 228, 230. A conveyor slat 16 like conveyor slat 16 in FIG. 5 snap fits onto the bearing 14.

As shown by FIG. 17, the channel 216 is formed by one vertical web and two horizontal flanges. The tongue 218 is formed by two vertical webs and two horizontal flanges. The tongue 218 is constructed to snuggly fit within the groove 216. The upper and lower flanges of the tongue include openings which are alignable with the openings in the upper and lower flanges of the groove 216 when the tongue 218 is within the groove. A bolt 240 extends through the aligned openings and receives a nut 242 at its lower end. Of course, other types of fasteners can be used. For example, the nut and bolt assembly 240, 242 can be replaced by a Huck bolt.

FIG. 19 shows a longitudinally straight, laterally curved conveyor composed of fifteen conveyor slats. Every third slat is a part of a different set of slats. That is, all of the slats 1 move together. All of the slats 2 move together. All of the slats 3 move together. In use, all fifteen slats are moved in unison in the direction in which it is desired to convey a load. They are moved a stroke distance which, by way of example, may be about one foot in length. Then they are stopped. Set 1 is retracted while sets 2 and 3 remain stationary. Then sets 1 and 3 remain stationary while set 2 is retracted. Then set 3 is retracted while sets 1 and 2 are stationary. Because the base of the conveyor is laterally curved and has a cellular construction, the base structure may require few or no additional structural members in order to withstand the loads imposed on it. A conveyor and base structure construction of the type shown by FIG. 19 may be placed into a receptacle for garbage in which the garbage is dumped into the receptacle through an open top. The garbage material falls down onto the slats 16 and the regions between the slats 16. The curvature and the cellular construction of the base structure, and the rather rugged construction of the slats, enables the slats and the regions between the slats to withstand the force of the material that is dropped on them through the opening in the top of the receptacle.

The illustrated embodiments are examples of the present invention and, therefore, are non-limitive. It is to be understood the changes in the particular structure, materials and features of the invention may be made without departing from the spirit and scope of the invention. Therefore, it is our intention that our patent rights not be limited by the particular embodiments that are illustrated and described herein, but rather the invention is to be determined by the following claims, interpreted according to accepted doctrines of patent claim interpretation, including use of the doctrine of equivalents.

What is claimed is:

1. In a reciprocating slat conveyor having a base structure that includes a plurality of longitudinal base sections that are connected together side-by-side along longitudinal side edges, said base structure including a plurality of laterally spaced apart guide beams extending longitudinally of the conveyor and longitudinal channels between the guide beams, an improved base structure comprising:

each base section having a lower wall, an upper wall spaced vertically above the lower wall, first and second opposite side portions connected to the upper and lower walls, and a plurality of divider walls spaced apart between the side portions and extending vertically between the upper and lower walls, said upper and lower walls, said side portions and said divider walls together forming laterally spaced apart cells which extend lengthwise of the base section; and wherein each base section includes at least one elongated guide beam that extends upwardly from the upper wall of the base section.

2. The base structure of claim 1, wherein said first side portion includes a laterally outwardly opening groove extending longitudinally of the first side portion;

said second side portion includes a laterally outwardly projecting tongue extending longitudinally of the second side portion; and said groove and said tongue being of a complementary size and shape, whereby the tongue on a first base section will fit into a groove in an adjacent second base section.

3. The base construction of claim 2, wherein when the tongue on the second side portion of a base section is inside the groove in the first side portion of the adjacent base section, the bevels form a V-shaped upper channel between the two sections and a V-shaped lower channel between the two sections, said V-shaped channels being adapted to receive weld beads.

4. The base structure of claim 2, wherein the first side portion of a first base section and the second side portion of an adjoining second base section are adapted to form a guide beam when the two sections are together and the tongue is inside the groove.

5. The base structure of claim 4, wherein each base section includes a guide beam positioned between its first side portion and its second side portion.

6. The base structure of claim 1, comprising a single guide beam having sidewalls and a top, wherein each sidewall extends substantially vertically above a said divider wall.

7. The base structure of claim 6, wherein a beveled outside corner is provided at an intersection between the upper wall and the first side portion, the upper wall and the second side portion, and the lower wall and the first side portion, and the lower wall and the second side portion.

8. The base structure of claim 1, wherein the first side portion of each base section extends between the upper and lower walls of the base section, and the second side portion of each base section extends between the upper and lower walls of the base section.

9. The base structure of claim 1, wherein the base structure is longitudinally straight and laterally curved, and the upper walls of the base sections follow an upwardly concave curve and the lower walls of the base sections follow a convex curve.

* * * * *